United States Patent
Lu et al.

(10) Patent No.: US 8,783,246 B2
(45) Date of Patent: Jul. 22, 2014

(54) SOLAR RECEIVER AND SOLAR POWER SYSTEM HAVING COATED CONDUIT

(75) Inventors: Cheng-Yi Lu, West Hills, CA (US); William Determan, Canoga Park, CA (US); David Grimmett, Canoga Park, CA (US); Gregory A. Johnson, Camarillo, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 1198 days.

(21) Appl. No.: 12/637,133

(22) Filed: Dec. 14, 2009

(65) Prior Publication Data

US 2011/0138811 A1    Jun. 16, 2011

(51) Int. Cl.
*F24J 2/24* (2006.01)
*F24J 2/48* (2006.01)
*F03G 6/00* (2006.01)

(52) U.S. Cl.
USPC ........... 126/676; 126/651; 126/653; 126/908; 60/641.15

(58) Field of Classification Search
USPC .................. 126/651–657, 670–671, 676–677
See application file for complete search history.

(56) References Cited

U.S. PATENT DOCUMENTS

| | | | | |
|---|---|---|---|---|
| 3,176,679 A | * | 4/1965 | Langley | 126/710 |
| 3,957,029 A | | 5/1976 | Nozik et al. | |
| 3,987,781 A | * | 10/1976 | Nozik et al. | 126/652 |
| 4,155,346 A | * | 5/1979 | Aresty | 126/652 |
| 4,186,725 A | * | 2/1980 | Schwartz | 126/694 |
| 4,249,514 A | | 2/1981 | Jones | |
| 4,334,523 A | * | 6/1982 | Spanoudis | 126/652 |
| 4,452,233 A | | 6/1984 | Goodman, Jr. et al. | |
| 4,505,263 A | | 3/1985 | Nameda et al. | |
| 4,579,107 A | * | 4/1986 | Deakin | 126/654 |
| 5,806,317 A | * | 9/1998 | Kohler et al. | 60/659 |
| 5,882,434 A | | 3/1999 | Horne | |
| 6,705,311 B1 | * | 3/2004 | Schwartzman et al. | 126/657 |
| 6,706,157 B2 | | 3/2004 | Boxman et al. | |
| 6,899,966 B2 | | 5/2005 | Benum et al. | |
| 7,055,519 B2 | | 6/2006 | Litwin | |
| 7,296,410 B2 | | 11/2007 | Litwin | |
| 2002/0037414 A1 | * | 3/2002 | Cunningham | 428/412 |
| 2004/0134484 A1 | * | 7/2004 | Barkai et al. | 126/653 |

(Continued)

FOREIGN PATENT DOCUMENTS

| | | | |
|---|---|---|---|
| JP | 3096058 | | 10/2000 |
| WO | WO 8200510 A | * | 2/1982 |
| WO | 2009105190 | | 8/2009 |
| WO | 2009140417 | | 11/2009 |

OTHER PUBLICATIONS

Patnaik, Pradyot. Handbook of Inorganic Chemicals (2003). McGraw-Hill. pp. 805-808.*

(Continued)

*Primary Examiner* — Thomas Denion
*Assistant Examiner* — Mickey France
(74) *Attorney, Agent, or Firm* — Carlson, Gaskey & Olds, P.C.

(57) ABSTRACT

A solar receiver device includes a metal conduit and a glass container disposed around the metal conduit such that there is a space between the glass container and the conduit. A coating is disposed on the metal conduit and has a composition that includes at least one element from silicon, titanium, aluminum, barium, and samarium.

18 Claims, 1 Drawing Sheet

(56) References Cited

U.S. PATENT DOCUMENTS

| | | | |
|---|---|---|---|
| 2004/0261789 A1* | 12/2004 | Nakauchi | 126/658 |
| 2005/0126170 A1* | 6/2005 | Litwin | 60/641.8 |
| 2005/0189525 A1* | 9/2005 | Kuckelkorn et al. | 252/582 |
| 2006/0225729 A1 | 10/2006 | Litwin | |
| 2007/0235023 A1 | 10/2007 | Kuckelkorn et al. | |
| 2008/0121225 A1* | 5/2008 | Kuckelkorn et al. | 126/635 |
| 2009/0163647 A1* | 6/2009 | DeLuca et al. | 524/588 |
| 2009/0208761 A1 | 8/2009 | Silmy et al. | |
| 2009/0314284 A1* | 12/2009 | Schultz | 126/710 |
| 2010/0300431 A1* | 12/2010 | Carrascosa Perez et al. | 126/652 |
| 2010/0313875 A1* | 12/2010 | Kennedy | 126/652 |
| 2010/0313877 A1* | 12/2010 | Bellman et al. | 126/653 |
| 2010/0326429 A1* | 12/2010 | Cumpston et al. | 126/710 |

OTHER PUBLICATIONS

Shannon et al. Refractive Index and Dispersion of Fluorides and Oxides (2002). J. Phys. Chem. Ref. Data, vol. 31, No. 4.*

International Search Report and Opinion mailed Feb. 1, 2012.

International Preliminary Report on Patentability for PCT/US2010/060183.

* cited by examiner

SOLAR RECEIVER AND SOLAR POWER SYSTEM HAVING COATED CONDUIT

BACKGROUND

This disclosure relates to solar power systems, and more particularly to a coating for enhancing performance of such systems.

Solar power systems are known and used to collect solar energy and convert that energy into electricity. As an example, solar trough systems are used to direct the solar energy toward a solar receiver to heat a working fluid that is carried through the solar receiver. Conventional solar receivers may include a sealed glass enclosure with a transfer tube running through the glass enclosure. The sealed glass enclosure is evacuated to reduce heat loss to the surrounding environment.

SUMMARY

An exemplary solar receiver device includes a metal conduit and a glass container disposed around the metal conduit such that there is a space between the glass container and the conduit. A coating is disposed on the metal conduit and has a composition that includes at least one element from silicon, titanium, aluminum, barium, and samarium.

In some examples, the solar receiver device may be used within a solar power system to receive solar energy directed from at least one solar reflector to heat a working fluid carried through the solar receiver. The heated working fluid may be received into a power generator to generate electricity.

Also disclosed is a method of processing the solar receiver that includes forming the coating on the metal conduit.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
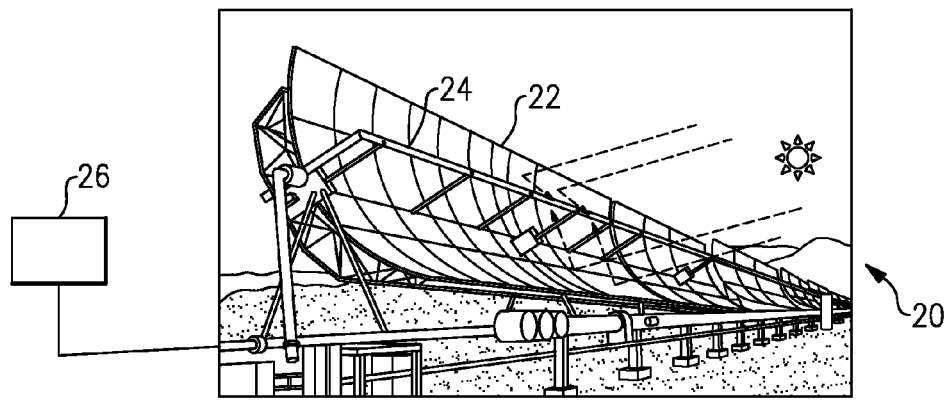
FIG. 1 illustrates an example solar power system.

FIG. 1 illustrates selected portions of an example solar power system 20 for collecting solar energy and converting that energy into electricity. It is to be understood that the disclosed solar power system 20 is only an example and that other arrangements may benefit from this disclosure. In this embodiment, the solar power system 20 includes at least one solar reflector 22 that is configured, such as in the form of a parabolic structure, to direct solar energy toward at least one solar receiver 24. The solar energy heats a working fluid, such as oil or other type of fluid, which circulates through the solar receiver 24. The solar receiver 24 is in fluid communication with a power generator 26, which receives the heated working fluid and generates electricity in a known manner, such as through use of a steam turbine generator. The working fluid may then recirculate through the solar receiver 24 for another cycle of heat transfer.

Figure 2:
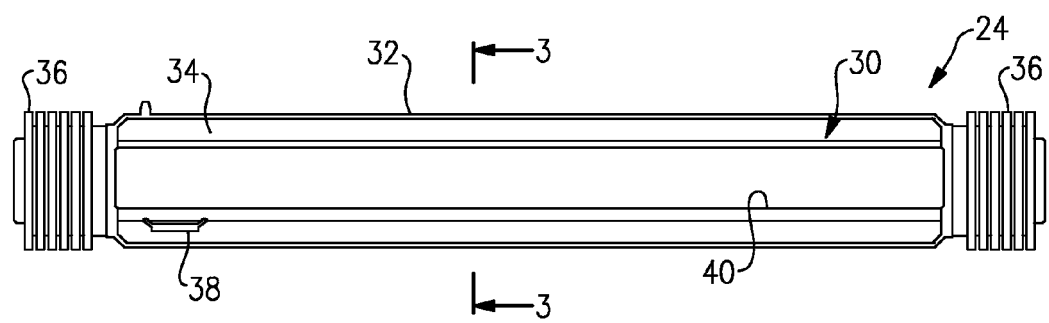
FIG. 2 illustrates an example solar receiver device that may be used in a solar power system.

FIG. 2 illustrates an example of one of the solar receiver devices 24 that may be used in the solar power system 20. In this case, the solar receiver device 24 may be connected end-to-end with other solar receiver devices 24 in a known manner. In this example, the solar receiver device 24 includes a metal conduit 30 for transferring the working fluid and a glass container 32 disposed around the metal conduit 30 such that there is a space 34 between the glass container 32 and the metal conduit 30. For instance, the space 34 may be evacuated to thermally insulate the metal conduit 30 from the surrounding environment. Bellow end caps 36 may be used for connecting the solar receiver 24 with other solar receivers and compensating for thermal expansion/contraction of the solar receivers.

Optionally, a getter 38 may be mounted within the space 34 for absorbing any gas that permeates through the metal conduit 30 into the space 34. Any gas that permeates through the metal conduit 30 reduces the vacuum level within the space 34 and debits the thermal insulating properties of the vacuum. Thus, a portion of the heat from the solar energy may be dissipated through the space 34 to the surrounding environment instead of absorbed into the working fluid.

As an example, the working fluid carried through the metal conduit 30 may contain gases that may permeate through the metal conduit 30 into the space 34. In this regard, the metal conduit 30 includes a coating 40 that functions as a barrier to gas permeation. In this case, the coating 40 is disposed on the inner surface of the metal conduit 30. However, in other examples the coating 40 may be disposed on the outside surface of the metal conduit 30.

The gas in the working fluid may evolve from decomposition of the working fluid over a period of use. For instance, decomposition of oil may produce hydrogen gas that, if allowed to permeate through the metal conduit 30, will reduce the vacuum within the space 34. The coating 40 may be of a composition that is designed to reduce hydrogen permeation through the metal conduit 30. For instance, the coating 40 composition includes at least one element selected from silicon, titanium, aluminum, barium, and samarium. The composition elements may be provided in oxide form such that the coating 40 includes one or more oxides of the above elements. In one example, the coating 40 includes oxides of silicon, titanium, aluminum, and barium. In a further example, the coating 40 also includes an oxide of samarium. The above oxides may be, for example, silicon dioxide ($SiO_2$), titanium dioxide ($TiO_2$), alumina ($Al_2O_3$), barium dioxide ($BaO_2$), and samaria ($Sm_2O_3$).

In some examples, the composition includes 24-68 wt. % oxide of silicon, 1-40 wt. % oxide of titanium, up to 20 wt. % oxide of aluminum, and 16-52 wt. % of oxide of barium. In a further example, the composition includes 34-58 wt. % oxide of silicon, 6-25.5 wt. % oxide of titanium, 5-10 wt. % oxide of alumina, and 26-42 wt. % oxide of barium. In a further example, the composition includes 44-48 wt. % oxide of silicon, 11-14.5 wt. % oxide of titanium, 7-8 wt. % oxide of aluminum, 31-37 wt. % oxide of barium.

In some embodiments, the coating 40 may also include additional constituents as hydrogen barrier materials, such as kaolinite clay, oxide of chromium, and bentonite clay. For instance, the above example compositions may additionally include 1-5 wt. % kaolinite clay, 0.1-5 wt. % oxide of chromium, and up to 5 wt. % bentonite clay. In a further example, the composition includes about 3 wt. % kaolinite clay, about 1 wt. % oxide of chromium, and about 0.3 wt. % bentonite clay. Any of these examples may additionally include 1-10 wt. % oxide of samarium, or even 2-6 wt. % oxide of samarium. In some examples, the kaolinite clay may include greater than 60 wt. % kaolinite (e.g., ball clay).

Figure 3:
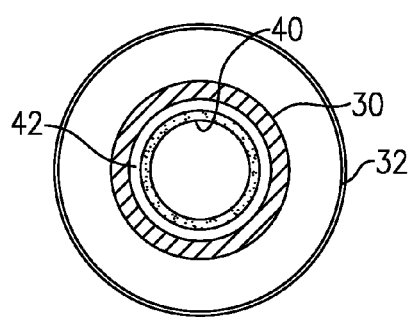
FIG. 3 illustrates a cross section of the solar receiver device shown in FIG. 2.

FIG. 3 illustrates a cross section of the solar receiver 24. In this case, the metal conduit 30 also includes an oxide bond layer 42 between the walls of the metal conduit 30 and the coating 40. For instance, the oxide bond layer 42 may be a chromate layer, an alumina layer, or combination thereof. The oxide bond layer 42 facilitates forming a strong bond between the coating 40 and the material of the metal conduit 30, which may be stainless steel or other metallic alloy.

The coating 40 may be formed on the metal conduit 30 using known techniques for forming oxide coatings. In one example, a slurry casting technique is used. In this technique, starting materials may be mixed with a carrier liquid, such as water, and then applied to the metal conduit 30. The carrier liquid may then be removed such that the starting materials remain on the surface of the metal conduit 30. The metal conduit 30 and deposited starting materials may then be heated at an elevated temperature, such as around 2100° F. (approximately 1150° C.), to consolidate the starting materials and form the coating 40. The slurry may be sprayed, brushed, or dipped onto the metal conduit 30, for instance. Additionally, several layers of the slurry may be applied, with a drying cycle in between application of each layer.

The oxide bond layer 42 may be formed prior to application of the slurry. As an example, the metal conduit 30 may be chromized or aluminized to respectively form a chromate layer or alumina layer on the metal conduit 30. The chromizing or aluminizing may include using a pack diffusion process wherein the metal conduit 30 is packed in a powder mixture containing chrome or aluminum metal, a chloride activator, and an inert filler material and then sealed and heated at an elevated temperature to diffuse the chrome or aluminum into the surface of the metal conduit 30. Given this description, one of ordinary skill in the art will recognize other processes or techniques for forming the oxide bond layer 42 on the metal conduit 30.

The metal conduit 30 may be treated prior to forming the oxide bond layer 42, such as by grit blasting the surface that is to be coated, to enhance adhesion and/or clean the surface. The oxide bond layer 42 may be further treated after formation in another grit blasting processing to enhance adhesion and/or clean the surface in preparation for forming the coating 40.

The slurry used to form the coating 40 may include starting materials that correspond to the desired composition of the coating 40. As an example, the starting materials may include silicon dioxide, titanium dioxide, alumina, barium dioxide, kaolinite clay, chromium oxide, bentonite clay, and/or samaria in amounts corresponding to the desired amounts in the composition of the coating 40.

In some examples, the silicon dioxide, titanium dioxide, alumina, and barium dioxide may be prepared as a glass frit wherein powders of each of the materials are mixed together, smelted, and ground into a composite powder or frit. The frit may then be mixed with other materials in the composition, such as the kaolinite clay, chromium oxide, bentonite, and samaria. That is, the major constituents of the coating 40 may be premixed in the frit to provide a uniform dispersion of the elements within the coating 40.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A solar receiver device comprising:
   a metal conduit;
   a glass container disposed around the metal conduit such that there is a space between the glass container and the metal conduit; and
   a coating disposed on the metal conduit, the coating having a composition that includes oxides of silicon, titanium, aluminum, and barium, wherein the coating is a monolayer.

2. The solar receiver device as recited in claim 1, wherein the composition includes an oxide of samarium.

3. The solar receiver device as recited in claim 1, further comprising an oxide bond layer between the metal conduit and the coating.

4. The solar receiver device as recited in claim 3, wherein the oxide bond layer is a chromate.

5. The solar receiver device as recited in claim 3, wherein the oxide bond layer is alumina.

6. A solar receiver device comprising:
   a metal conduit;
   a glass container disposed around the metal conduit such that is a space between the glass container and the metal conduit; and
   a coating disposed on the metal conduit, the coating having a composition including 24-68 wt. % oxide of silicon, 1-40 wt. % oxide of titanium, up to 20 wt. % oxide of aluminum, and 16-52 wt. % oxide of barium.

7. The solar receiver device as recited in claim 6, including 34-58 wt. % oxide of silicon, 6-25.5 wt. % oxide of titanium, 5-10 wt. % oxide of alumina, and 26-42 wt. % oxide of barium.

8. The solar receiver device as recited in claim 7, including 44-48 wt. % oxide of silicon, 11-14.5 wt. % oxide of titanium, 7-8 wt. % oxide of aluminum, 31-37 wt. % oxide of barium.

9. The solar receiver device as recited in claim 6, further comprising 1-5 wt. % kaolinite clay, 0.1-5 wt. % oxide of chromium, and up to 5 wt. % bentonite clay.

10. The solar receiver device as recited in claim 9, including about 3 wt. % kaolinite clay, about 1 wt. % oxide of chromium, and about 0.3 wt. % bentonite clay.

11. The solar receiver device as recited in claim 9, further comprising 1-10 wt. % oxide of samarium.

12. The solar receiver as recited in claim 11, including 2-6 wt. % oxide of samarium.

13. A solar power system comprising:
    at least one solar receiver for carrying a working fluid;
    at least one solar reflector for directing solar energy towards the at least one solar receiver to heat the working fluid; and
    a power generator for receiving the heated working fluid and generating electricity, and wherein the at least one solar receiver includes a metal conduit, a glass container disposed around the metal conduit such that there is a space between the glass container and the conduit, and a coating disposed on the metal conduit, the coating having a composition including 24-68 wt. % oxide of silicon, 1-40 wt. % oxide of titanium, up to 20 wt. % oxide of aluminum, and 16-52 wt. % oxide of barium.

14. A method of processing a solar receiver device, comprising:
forming a coating on a metal conduit that is to be disposed within a glass container around the metal conduit such that there is a space between the glass container and the conduit, the coating being formed with a composition that includes 24-68 wt. % oxide of silicon, 1-40 wt. % oxide of titanium, up to 20 wt. % oxide of aluminum, and 16-52 wt. % oxide of barium.

15. The method as recited in claim 14, wherein the forming of the coating includes casting the coating using a slurry.

16. The method as recited in claim 14, further including chromizing or aluminizing the metal conduit prior to forming the coating to form an oxide bond coat on the metal conduit.

17. A solar receiver device comprising:
a metal conduit;
a glass container around the metal conduit such that there is a space between the glass container and the metal conduit; and
a coating disposed on an inner surface of the metal conduit, the coating having a composition that includes oxides of silicon, titanium, aluminum, and barium.

18. A solar receiver device comprising:
a metal conduit;
a glass container disposed around the metal conduit such that there is a space between the glass container and the metal conduit; and
a coating disposed on the metal conduit, the coating having a composition that includes oxides of silicon, titanium, aluminum, and 16-52 wt. % oxide of barium.

\* \* \* \* \*